United States Patent [19]
Larsson

[11] Patent Number: 6,031,197
[45] Date of Patent: Feb. 29, 2000

[54] RESISTANCE RAIL WELDING DEVICE WITH ALIGNMENT MECHANISM

[75] Inventor: Rolf Larsson, Laxå, Sweden

[73] Assignee: Esab AB, Göteborg, Sweden

[21] Appl. No.: 09/077,722

[22] PCT Filed: Dec. 4, 1996

[86] PCT No.: PCT/SE96/01597
§ 371 Date: Jun. 5, 1998
§ 102(e) Date: Jun. 5, 1998

[87] PCT Pub. No.: WO97/21514
PCT Pub. Date: Jun. 19, 1997

[30] Foreign Application Priority Data

Dec. 5, 1995 [SE] Sweden .................................. 9504368

[51] Int. Cl.[7] .................................................. B23K 11/04
[52] U.S. Cl. ............................................ 219/53; 219/101
[58] Field of Search ................................ 219/53, 54, 55, 219/95, 97, 101

[56] References Cited

U.S. PATENT DOCUMENTS

| | | |
|---|---|---|
| 2,124,849 | 7/1938 | Drain ..................................... 219/97 X |
| 2,875,718 | 3/1959 | Bieri et al. ............................ 219/97 X |
| 4,270,036 | 5/1981 | Zollinger ................................... 219/53 |
| 4,320,708 | 3/1982 | Bommart ............................. 219/53 X |
| 4,641,818 | 2/1987 | Bommart ............................. 219/53 X |
| 4,645,897 | 2/1987 | Gourlay et al. ......................... 219/101 |
| 5,270,514 | 12/1993 | Wechselberger et al. ........... 219/55 X |
| 5,763,850 | 6/1998 | Hardt .................................... 219/55 X |

FOREIGN PATENT DOCUMENTS

| | | |
|---|---|---|
| 499019 | 8/1992 | European Pat. Off. . |
| 2557485 | 7/1985 | France .................................... 219/97 |
| 2219761 | 12/1989 | United Kingdom .................... 219/55 |
| 94/29065 | 12/1994 | WIPO .................................... 219/97 |

*Primary Examiner*—Gregory Mills
*Attorney, Agent, or Firm*—Dvorak & Orum

[57] ABSTRACT

A device for welding together elongated work pieces such as railroad track, is provided with controls to eliminate pre-existing angles that exist between each work piece prior to joining.

24 Claims, 6 Drawing Sheets

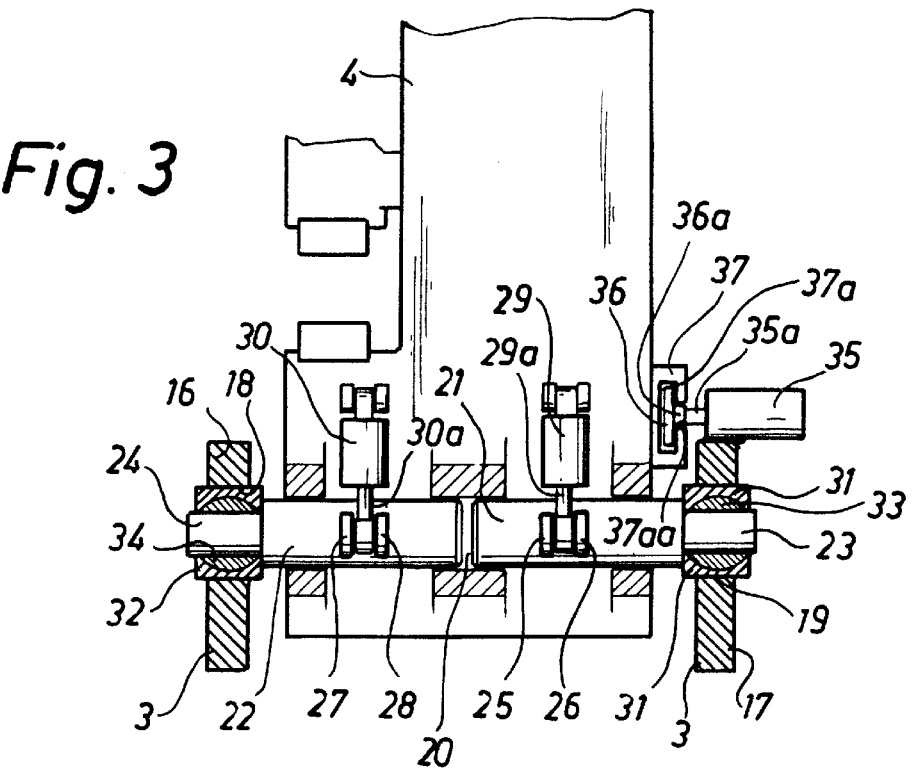
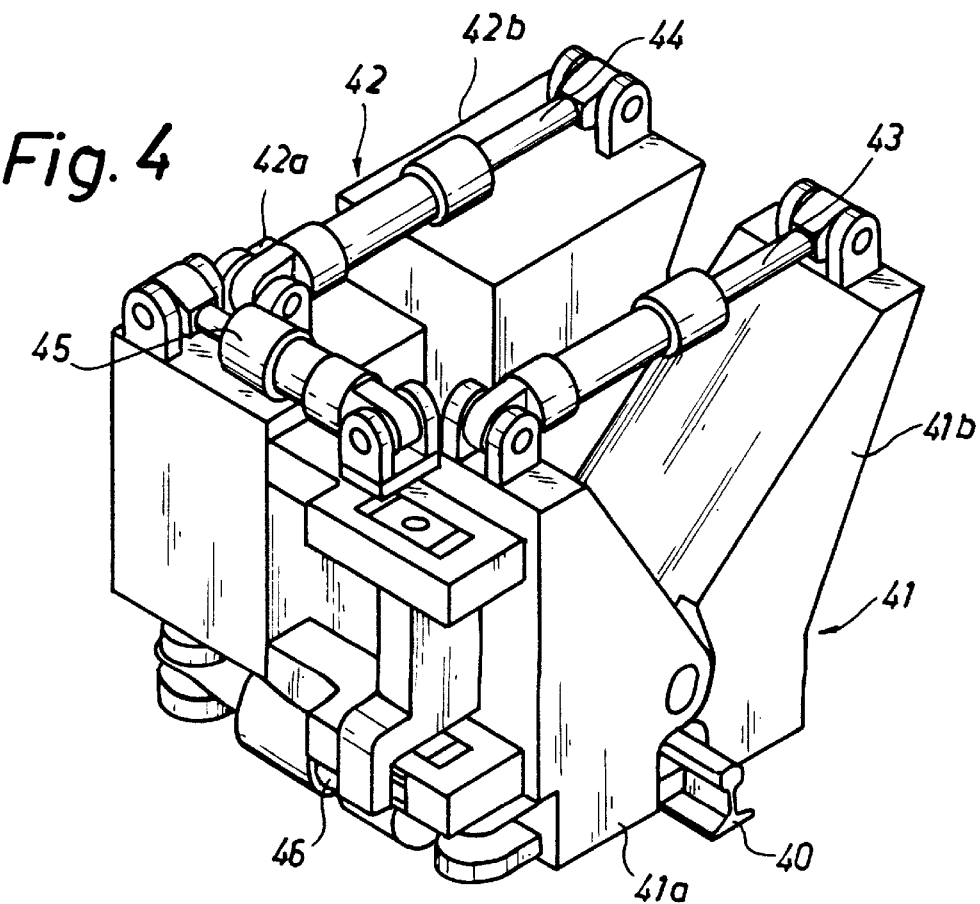

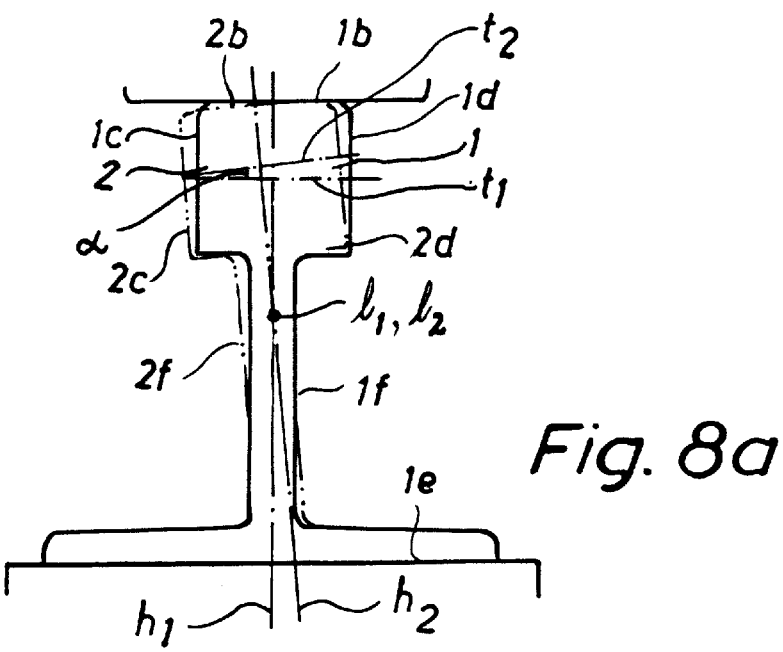
Fig. 8a
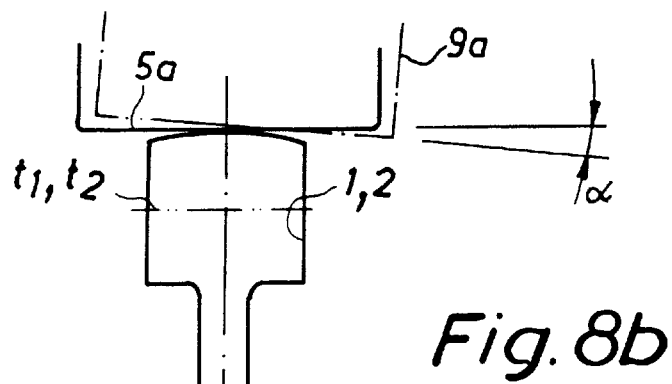
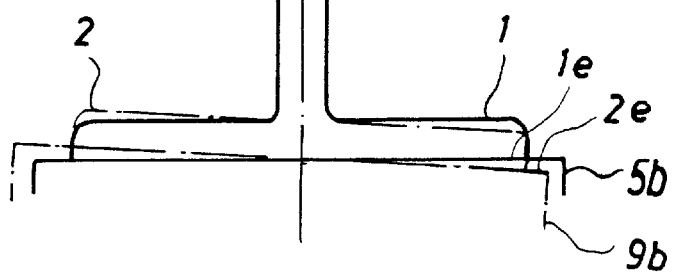
Fig. 8b

RESISTANCE RAIL WELDING DEVICE WITH ALIGNMENT MECHANISM

BACKGROUND OF THE INVENTION

1. Field of the Invention

The present invention relates to a device for welding together a first elongate work piece, such as a first rail, with a second elongate work piece, such as a second rail, end to end, by means of butt-weld resistance welding, particularly flash welding. The device comprises a structure and a carriage movably connected to the frame structure and slidable with respect thereto in the longitudinal direction of the work pieces, a first clamping device mounted on the frame structure or on parts associated therewith to fixedly clamp the first work piece, a second clamping device mounted on the carriage to fixedly clamp the second work piece, electrodes mounted on the frame structure and the carriage or on the clamping devices to heat the work pieces to the desired welding temperature, and a press element to press the facing ends of the heated work pieces against one another in the longitudinal direction of the work pieces to form a bonding welding joint.

2. Discussion of the Prior Art

One problem found in the use of a device of the above-mentioned kind for welding together for example a number of separate rails to form one long continuous rail is to ensure that each welding joint between two adjoining rails possesses a sufficiently high breaking strength and that each rail is securely welded in such a position that the upper part of the continuous rail thus formed, i.e. the so called rail head, is given a smooth running surface along its upper face and external flank, the so called track-forming edges, on which the railroad car wheels travel. To achieve this aim extremely careful relative orientation of the ends of two adjacent rails is required transversally as well as vertically. In EP-0 119 098 is described for instance an alignment apparatus comprising alignment means for alignment of two adjacent rail ends relatively to one another transversely as well as vertically. The alignment means are removed prior to the final welding together.

As the ends of the descrete rails usually are not manufactured to such a precision that their transverse end faces are completely straight and extend in parallel with each other when the work pieces are clamped in position in the frame and the carriage, it is common practice to subject them to a so called pre-flashing treatment prior to the welding-together proper in order to remove surplus material for reduction of the spacing between the ends. The rail flanks and/or the upper surfaces are not either manufactured to such a precision as to be completely straight, with the result that also when the work piece clamping members are positioned in parallel with one another a level running surface may not be obtained on the head of the finished continuous rail. The situation is further aggravated by the fact that in an area around the interconnecting welding joint the rail may be slightly deformed in the course of the subsequent cooling. Since the short-circuiting risks increase the larger the surface of contact between the transverse end faces, the risk of short-circuiting consequently becomes particularly imminent in the case of rails wherein the end faces are completely parallel.

Another problem found in several of the welding devices used today, such as flash welding machines, is the use of a press element in the form of one large pressure cylinder only, a so called upsetting cylinder, for the final pressing-together of the work pieces, such as rails, in which case molten and oxidised material is squeezed outwards from the facing ends of the work pieces while at the same time the material underneath which is heated to welding temperature, is welded together. Since in this kind of welding devices lack of space makes it difficult to position this pressure cylinder in such a manner that its longitudinal axis, i.e. centre line, coincides with the longitudinal axes of the work pieces, this kind of upsetting cylinder generates a moment of force which acts on the frame. The moment of force is of considerable magnitude, although the distance between the pressure cylinder longitudinal axis and said longitudinal axes is comparatively small, since the press force required to achieve the pressing together is of considerable magnitude. As a result, the welding device must be provided with a sufficiently large and heavy frame to absorb moments of force without buckling. From e.g. DE-1 068 402 it is already known to position upsetting cylinders symmetrically on either side of the rails to be welded together, in order to reduce the bending forces and torsional torque exerted on the frame during the upsetting operation. A condition for this effect to be obtained is to provide for excellent mechanical linear guidance, ensuring that the two work pieces are maintained in parallel relationship during the upsetting operation. These upsetting cylinders are controlled in common to provide a parallel movement of the upsetting cylinders. Should the relative heights or lateral extensions of the work pieces be changed during the upsetting operation, the moment of force of the upsetting cylinders will not be evened out and consequently the resulting moment of force must be absorbed by the frame, which therefore must be provided with an additional frame part. On the other hand, there is no mention in this patent publication that the welding device is configured in a manner allowing it to compensate for technical manufacturing deficiencies in the rails, such as curved track-forming edges.

A further problem found in prior art welding devices is that they do not offer any possibility of compensating for the kind of deformation of the welding joint formed during the welding operation that may be caused by the very pressing-together of the rail on account of the bending forces arising during this operation, which deformation may result in an unacceptable welding-together of the two work pieces, despite careful and accurate alignment of the work pieces prior to the welding-proper.

SUMMARY OF THE INVENTION

One object of the present invention thus is to provide a welding device allowing two work pieces to be welded together in an acceptable manner also when the work pieces are not manufactured to a sufficient degree of precision with respect to the appearance of the external faces or their external configuration.

A further object of the present invention is to allow alignment of the work piece ends in such a manner that a straight welding joint may be formed despite any deformation as may arise during the subsequent cooling operation.

A further object of the present invention is to allow the work piece ends to be aligned in such a manner that short-circuiting at the beginning at the welding-together operation is avoided, also in work pieces the end faces of which are not entirely parallel.

These objects are obtained in accordance with the present invention by means of a welding device of the kind outlined in the introduction and which device is characterized by at least two actuators which are individually controllable relative to one another for turning the facing ends of the work pieces in such a manner that the transverse axes $t_1$, $t_2$ and/or the vertical axes $h_1$, $h_2$ and/or the longitudinal axes $l_1$, $l_2$ of the work pieces form an angle $\alpha$, $\beta$, and $\delta$, respectively, between one another, or in such a manner that an existing angle $\alpha$, $\beta$, and $\delta$, respectively, formed between the transverse axes, and/or the vertical axes and/or the longitudinal axes of said work pieces is essentially eliminated prior to and/or during and/or after the pressing operation.

Due to the provision of at least two actuators that are individually controllable with respect to one another for adjustment of the facing ends of the work pieces it becomes possible to align the work pieces in such a manner that an acceptable welding joint is obtained, even when the work pieces are not manufactured to the desired precision with respect to their external faces, or when they are deformed during the cooling taking place after the welding-together operation or when the transverse end faces of the work pieces obtain too high a degree of parallelism during the preflashing considering the short-circuiting risk. Owing to the individual control of the actuators it becomes possible either to control two actuators in parallel, i.e. in common, causing the carriage to move relative to the frame in a lengthwise and/or lateral and/or longitudinal direction, or to control them separately. If the actuators are operated separately, the facing ends of the work pieces may be turned relatively to one another in such a manner that the corresponding external faces of the work pieces may be placed level with one another, also when the corresponding external face on one of the work pieces is curved. Owing to this arrangement it becomes possible also to turn two work pieces, such as square rods, the end faces of which are parallel in principle, in such a manner that the vertical axes of the rods form an angle $\beta$ relative to each other prior to the pressing operation, whereby short-circuiting in the initial stages of the welding-together operation is avoided. Once the welding-together has started, the work pieces are turned back over the corresponding angle to ensure that a straight welding joint is formed.

At least one of the actuators preferably simultaneously serves as a press element. Owing to this arrangement the welding device is able to allow compensations to be made for any undesired misalignment of the work pieces that may arise during the very pressing-together operation.

Preferably, the ends of the upsetting cylinders are pivotally connected to the frame etc. and to the carriage in separate attachment points, said attachment points being so positioned relative to one another that the total moment of force exerted on the frame during the pressing operation is essentially eliminated. The upsetting cylinders need not, however, be positioned symmetrically in order to be able to essentially eliminate the moment of force. This arrangement results in a welding device that does not buckle during the very pressing operation, notwithstanding the comparatively weak structure of its frame structure and consequently the entire welding device may be made less voluminous and thus also becomes less expensive to manufacture.

DETAILED DESCRIPTION OF THE DRAWINGS

The invention will be described in closer detail in the following with reference to the accompanying drawings, illustrating two possible embodiments of the welding device accordance with the present invention.

Figure 1:
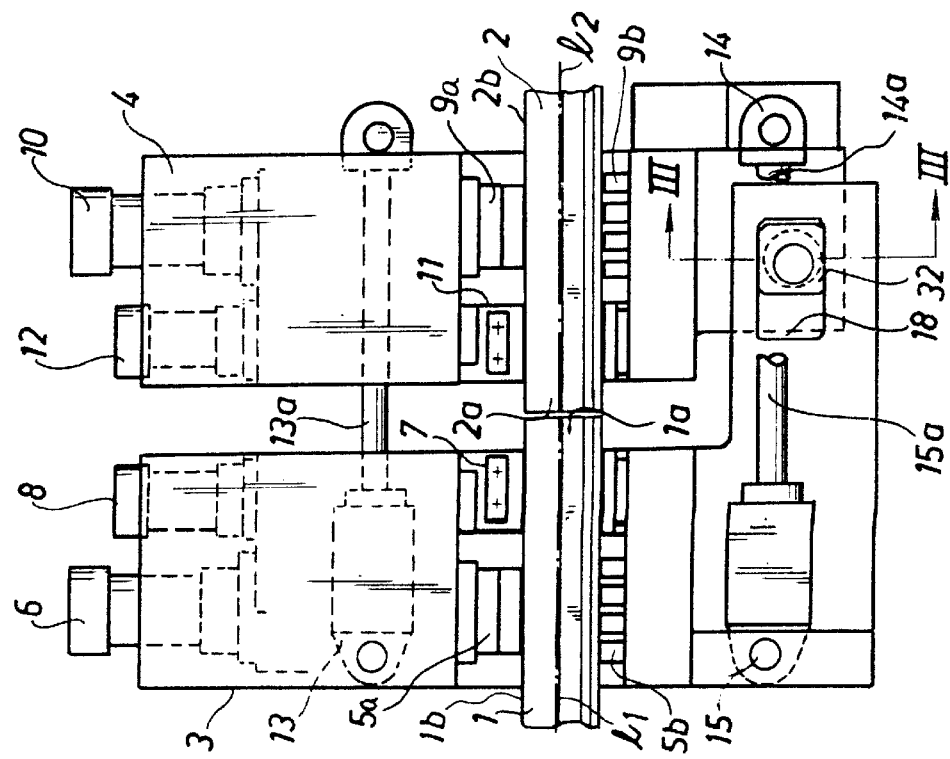
FIG. 1 is front view of a stationary welding device in accordance with the present invention, with a first and a second rail positioned therein.

FIG. 3 section taken on line III—III of FIG. 1.

FIG. 4 is a view as seen obliquely from the front and illustrates a mobile welding device in accordance with the present invention.

Figure 5:
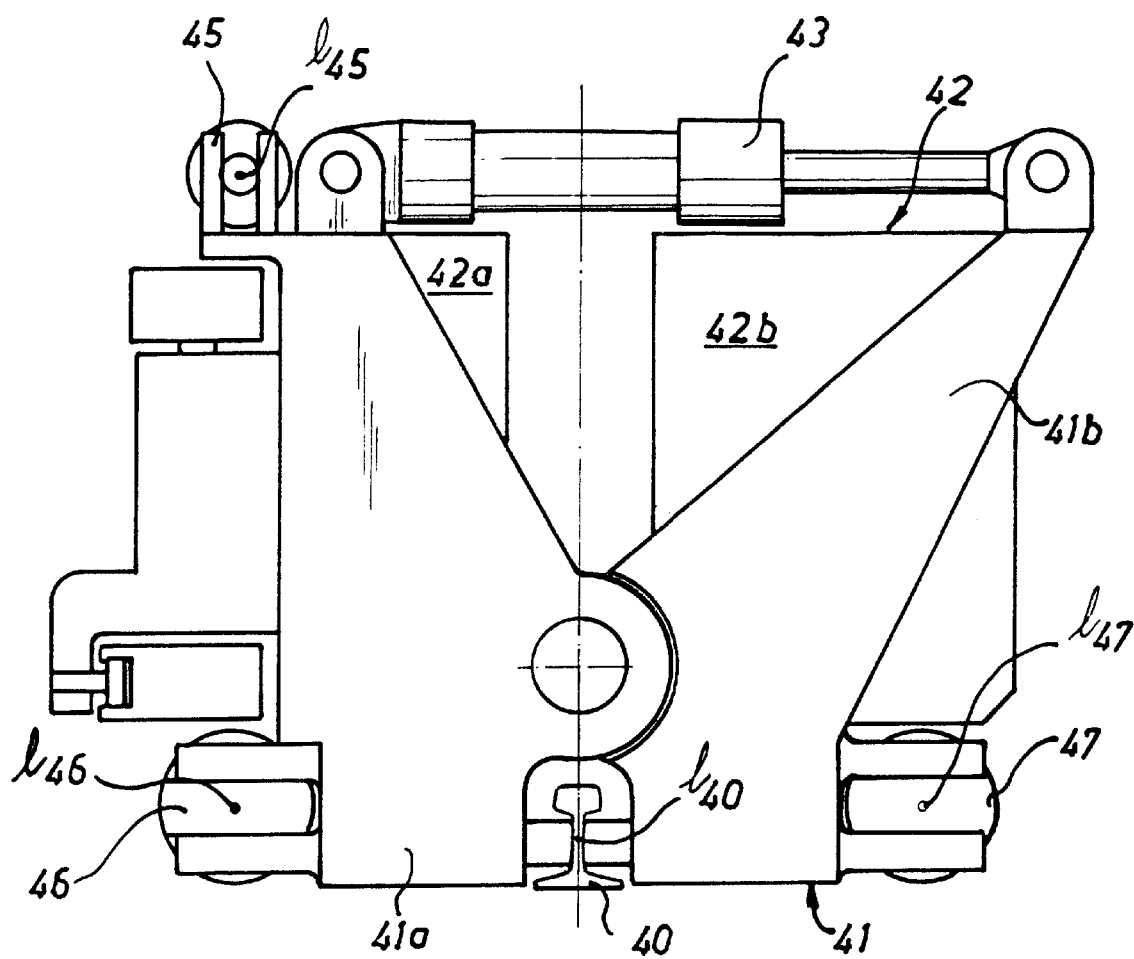

FIG. 5 is a view as seen straight from the front of the mobile welding device of FIG. 4.

Figure 6A:
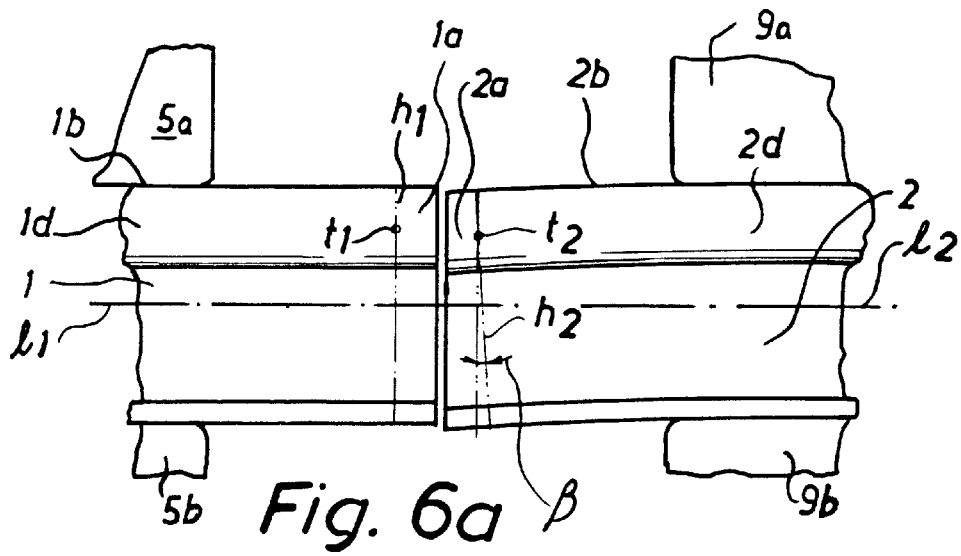
Figure 6B:
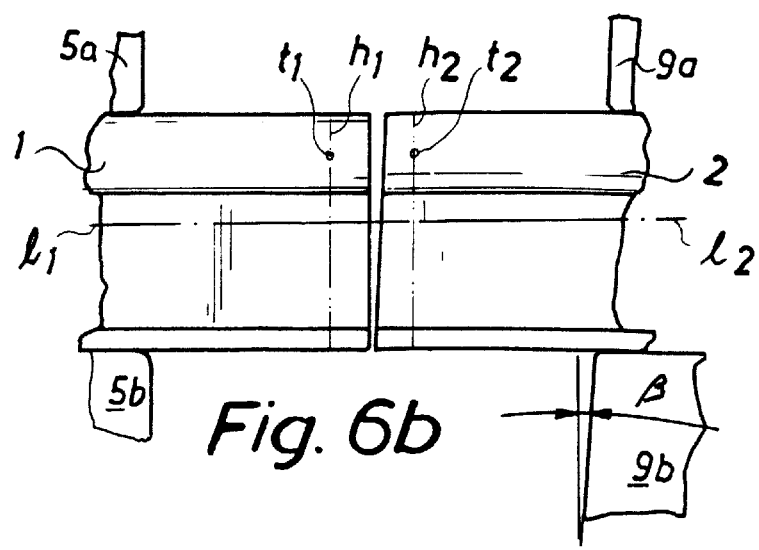
Figure 6C:
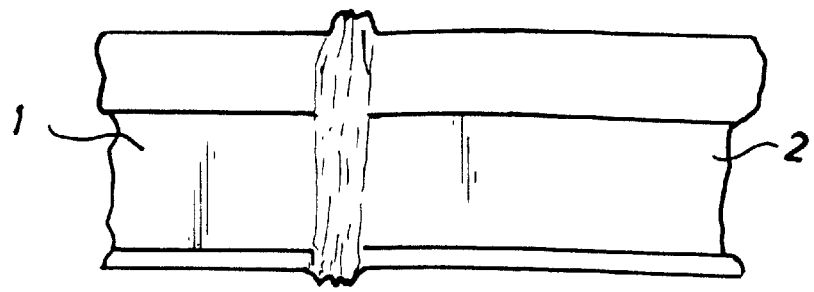

FIGS. 6a–6c are enlarged part views of the rails in accordance with FIG. 1 during various stages of the welding operation.

Figure 7A:
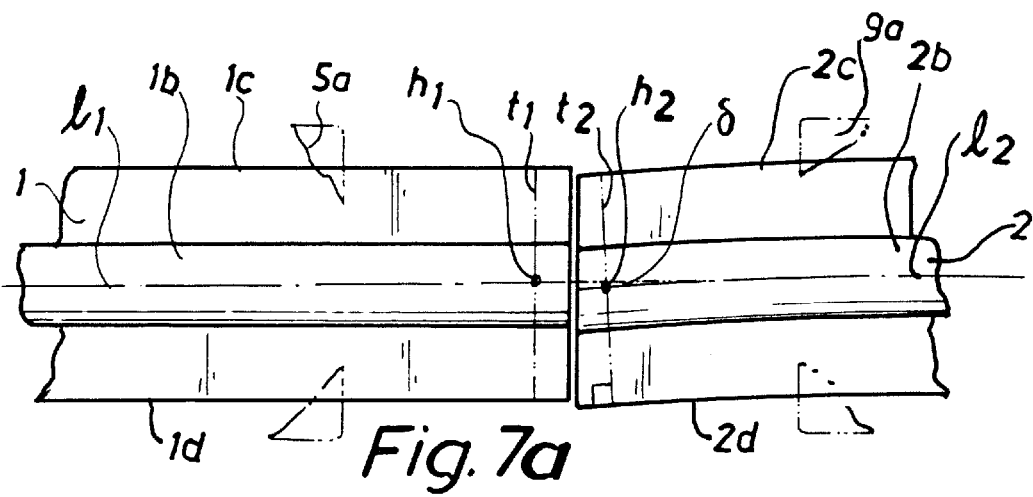
Figure 7B:
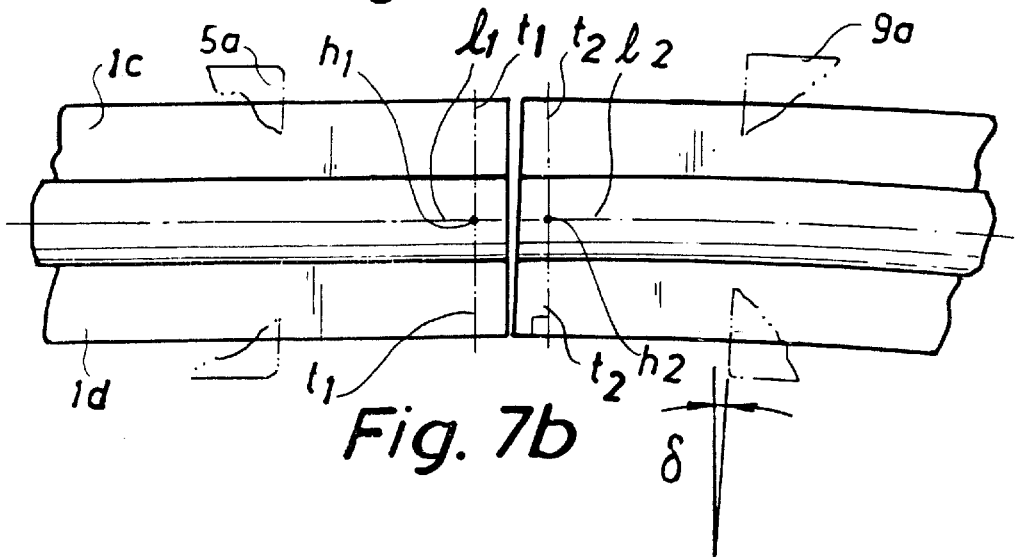
Figure 7C:
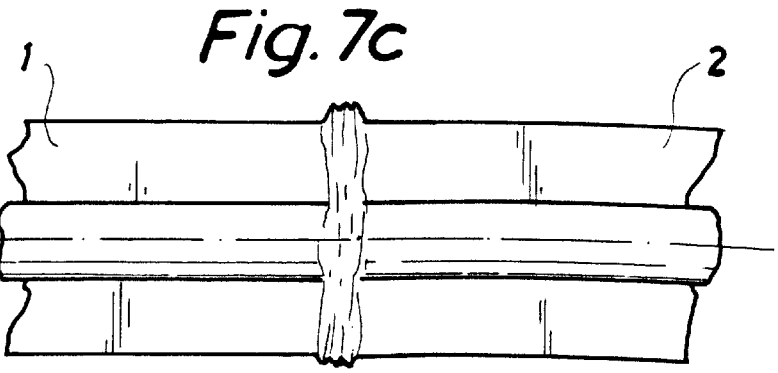

FIGS. 7a–7c are part views similar to FIGS. 6a–6c as seen from above the rails.

Figure 2:
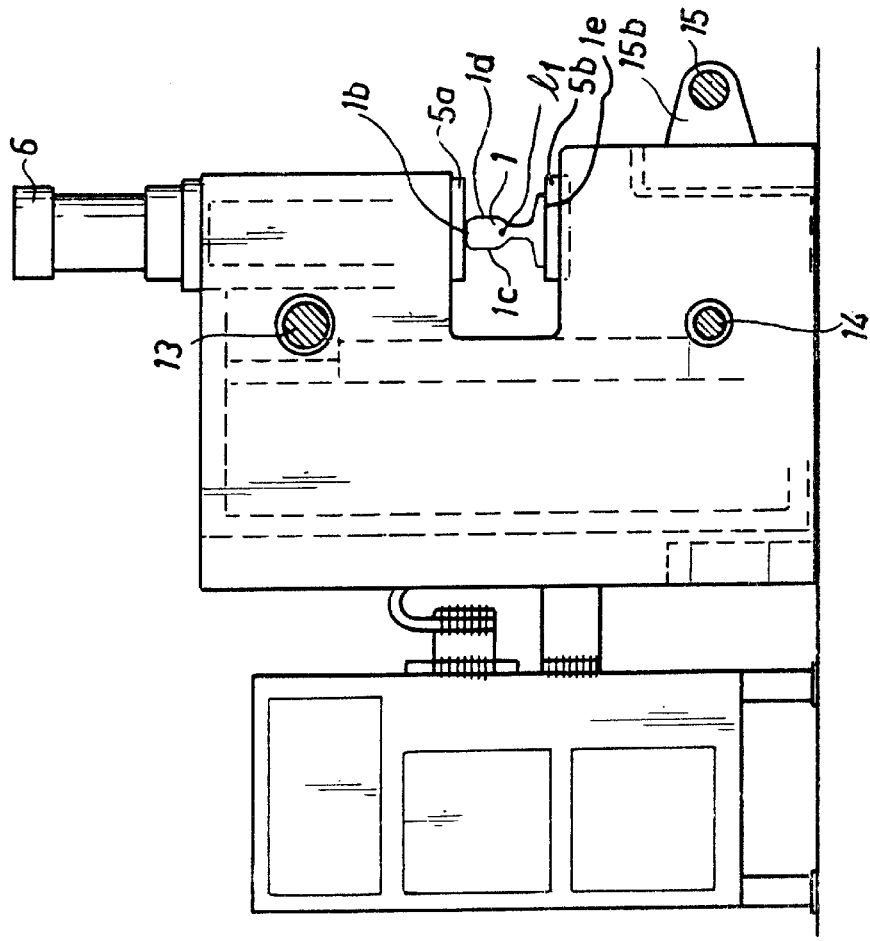
FIG. 2 is a lateral view of the device in accordance with FIG. 1.

FIGS. 8a and 8b are enlarged part views of the rails in accordance with FIG. 2.

DETAILED DESCRIPTION OF THE REFERRED EMBODIMENT

The welding device illustrated in FIG. 1 is intended to be used for welding together two rails 1, 2 at the front rail portions 1a and 2a by means of flash welding. By the front end portion is to be understood an area extending a distance of approximately 10–20 mm into the rails from the end face of the respective rail. The device consists of a stationary frame structure 3 and a carriage 4 movably connected thereto. The frame is provided with clamping dies 5a, 5b in the form of one lower and one upper die 5a and 5b, respectively, by means of which the rail 1 is secured in the frame 3. The dies are clamped about the rail by means of a cylinder 6. As appears from FIG. 2, the upper die abuts against the upper face 1b of the rail head and the lower die against the bottom face 1e of the rail. The frame is also provided with electrode dies 7 which are clamped about the rail 1 by means of a cylinder 8 adjacent the rail end portion 1a, to supply current for heating said end to the desired welding temperature. In a corresponding manner, the carriage 4 is provided with clamping dies 9a, 9b in the form of one upper and one lower die 9a and 9b, respectively by means of which the rail 2 is secured to the carriage 4. These dies are clamped about the rail by means of a cylinder 10. As appears from FIG. 1, the upper die abuts against the top face 2b of the rail head and the lower die against the bottom face of the rail. The carriage is also provided with electrode dies 11 which are clamped about the rail 2 by means of a cylinder 12 in the vicinity of the rail end portion 2a, to supply current for heating said end to the desired welding temperature. Three individually controllable actuators in the form of upsetting cylinders 13, 14 and 15 interconnect the carriage with the frame, the cylinder bodies of said cylinders being pivotally connected to the frame 1 in separate attachment points whereas their associated piston rods 13a, 14a and 15a, respectively, are pivotally connected with the carriage 4, making the cylinder axes pivotable relative to the frame. As appears from FIG. 2, the cylinder 15 is attached to the frame 1 by means of a bracket 15b. It is also of uttermost importance that the cylinders operate in such a manner relatively to one another that the total torque exerted on the frame 1 during the pressing-together operation is eliminated. As appears from FIG. 2 this is achieved in accordance with the present embodiment by positioning the attachment points, of the cylinders 13 and 14 in alignment in the vertical direction, and equally spaced from the longitudinal axis 11 of the rail 1, and by positioning the attachment points of cylinders 14 and 15 in alignment, laterally and equally spaced from the longitudinal axis 11 of the rail 1. Also other positions of the upsetting cylinders 13, 14 and 15 are acceptable. However, the upsetting cylinders should be positioned to ensure that imaginary lines interconnecting the cylinder attachment points form a triangle.

As most clearly apparent from FIG. 3 the lower part of the frame 3 is provided with two parallel legs 16, 17 positioned on either side of the lower part of the carriage 4. Each leg 16 and 17 is formed with its respective end-to-end aperture 18 and 19. The lower part of the carriage is provided with an end-to-end aperture 20 in which two shafts 21, 22 are received so as to project somewhat beyond the aperture ends. Each shaft 21, 22 is provided at its outer end with a pin 23 and 24, respectively, said pins being positioned eccentrically with respect to the shaft center. Each shaft 21 and 22 is provided with a pair of projections 25, 26 and 27, 28, respectively, each projection pair being rotationally connected with an actuator in the form of an actuating cylinder 29 and 30, respectively, via associated piston rods 29a and 30a respectively. The cylinder bodies of the cylinders are in turn pivotally connected to the carriage 4.

As also appears from FIG. 3 each eccenter pin 23, 24 is mounted in its respective one of apertures 18, 19 by means of sliding blocks 31 and 32, respectively. The eccenter pins 23, 24 are rotationally connected with the sliding blocks by means of disk-shaped seats 33 and 34, respectively. As appears from FIG. 1, the apertures 18, 19 are configured in such a manner that vertically they are practically completely filled by the sliding blocks whereas in the longitudinal direction of the rails they are approximately twice as long as the sliding blocks. Consequently, the carriage is displaceble relative to the frame in the longitudinal direction of the rails and this displacement is effected by the upsetting cylinders 13, 14, and 15.

The carriage is also displacable in the transverse direction of the rails by means of a cylinder 35 which is rigidly connected with the leg 17 of the frame 3. At its outer end the piston rod 35a of said cylinder is connected with a plate 36 which is positioned in a guide rail 37 connected to the carriage 4. The guide rail 37 is formed with a groove 37a, and the dimensions of the plate are such that the height of the plate exceeds the width of the groove at the mouth 37aa whereas the plate end portion 36a, which is connected with the piston rod 35a, has a smaller width than the mouth. This arrangement ensures that upon displacement along the longitudinal axis $l_2$ of the rail 2 the guide rail-may be displaced relatively to the plate 36 without risking to be disengaged from the plate.

Drawing FIGS. 6a–6c show only the rails 1 and 2 and the clamping dies 5a, 5b and 9a, 9b, respectively, in a lateral view, and the outer flanks of the rail head are designated by 1d for rail 1 and by 2d for rail 2. The upper surfaces 1b, 2b and the flanks 1d, 2d form the track-forming edge faces on which the railroad car wheels travel. In these drawing figures are also indicated the longitudinal axes $l_1$ and $l_2$ of rails 1 and 2 as well as the vertical axes $h_1$ and $h_2$ and the transverse axes $t_1$ and $t_2$. By the expressions vertical axes and transverse axes is to be understood in the introductory part of the description, the description of the drawing figures, the claims, and the abstract an axis extending at right angles to the upper face of the associated rail in the front end part of the rail, and an axis extending at right angles to the external flank of the associated rail in the front end part of said rail, respectively. When the device described above is to be used for welding together rails 1 and 2, the rails are clamped in position by clamping dies 5 and 9, respectively, which originally are positioned in parallel relationship, see FIG. 6a.

As appears from FIG. 6a the upper surface 1b of the rail 1 is completely straight, whereas the upper surface 2b of rail 2 is curved. If the rails were to be pressed together while assuming the position illustrated in FIG. 6a the head of the continuous rail thus formed would present a curved running surface along its upper face. This is not acceptable because the resulting rail would in this case have to be submitted to complicated post-treatment in order to meet the requirements on straightness in the running surface. To remedy the situation, the carriage 4 is turned in accordance with the teachings of the invention and consequently also the clamping dies 9a, 9b as well as the rail 2 which is clamped between the dies in the transverse direction $t_2$ as illustrated in FIG. 6b, in order to compensate for the angle β between the vertical axes in the starting position, see FIG. 6a. The rail 2 is turned by means of the cylinders 13, 14, and 15. The turning movement is effected by activation of either cylinders 14 and 15 in such a manner that their piston rods move at the same relative speed whereas cylinder 3 remains inactivated, or else cylinder 13 is activated whereas cylinders 14 and 15 remain inactivated. To bring the upper faces 1b, 2b of the rails at the front portions 1a and 2a, respectively, to the-same level the clamping dies 9a, 9b, and consequently the rail 2, are turned until the vertical axes h1 and h2 become essentially parallel, i.e. the clamping dies 9a, 9b and the rail 2 are turned over angle a as illustrated in FIG. 6b. The alignment of rail 2 relatively to rail 1 having been completed, the electrode dies 7 and 11 are activated to heat the end portions of rails 1 and 2 to the desired welding temperature. The pressure cylinders 13, 14, and 15 are then activated in order to force the end portions of rails 1 and 2 together to form a bonding welding joint as illustrated in FIG. 6c.

FIGS. 7a–7c show only rails 1 and 2 and the clamping dies 5a, 5b and 9a, 9b, respectively, in a view from above. These drawing figures illustrate the manner in which the flanks 1c, 1d and 2c, 2d, respectively, of rails 1 and 2 are displaced to a position in which they are level with one another despite the rail 2 having curved and not straight flanks. FIG. 7a illustrates the rails 1 and 2 in the position in which they are clamped by the clamping dies 5a, 5b and 9a, 9b, respectively, in their parallel starting position. FIG. 7b illustrates the rails 1 and 2 assuming the position after the clamping dies 9a, 9b, and thus rail 2, having been turned so as to bring the flanks of the front end portions 1a and 2a level with one another. In this position the rail 2 has been turned about its vertical axis $h_2$ over an angle δ, which is the angle between the longitudinal axes $l_1$ and $l_2$ of rails 1 and 2, respectively, in the starting position, see FIG. 7a. Like in the previous case, also clamping dies 9a, 9b have been turned over this angle from their original position, see FIG. 7b. This angular adjustment is achieved by activating either the upsetting cylinders 13 and 14 in such a manner that their piston rods move at the same speed relatively to one another whereas the upsetting cylinder 15 remains inactivated, or in such a manner that cylinder 15 is activated whereas upsetting cylinders 13 and 14 remain inactivated. The angular adjustment having been completed the very welding together of the rails 1 and 2 is effected in the same manner as described in connection with FIG. 6c.

FIGS. 8a and 8b show only the rails 1 and 2 and the clamping dies 5a, 5b and 9a, 9b, respectively, as seen in a lateral view, and in order to make rail 2 visible it is marked by dash-and-dot lines. As appears from FIG. 8a the rail 2 has both a curved upper surface 2b and a curved web 2f. In order to bring both the heads 1b and 2b and the webs 1f and 2f of rails 1 and 2, respectively, to a position in alignment in front of one another rail is turned about its longitudinal axis $l_2$ over an angle α which equals the angle between the transverse axes $t_1$ and $t_2$ of rails 1 and 2 in the starting position in which the clamping dies 5a, 5b and 9a, 9b are oriented in parallel with one another. Like before, the changed position of the clamping dies 9a, 9b has been chosen to illustrate the angular turning movement over angle α. The turning movement about the longitudinal axis $l_2$ of the rail 2 thus makes it possible to compensate for curvatures in the rail profile. In order to turn the rail 2 about its longitudinal axis only one of the actuating cylinders 29 and 30 is activated, or else the cylinders are activated in such a manner that their piston rods move at different speeds relatively to one another. The angular adjustment having been completed, the rails 1 and 2 are welded together in the manner described previously in connection with FIG. 6c.

Because it is assumed in FIGS. 6a–8b that the rail 1 is completely straight and that the clamping dies 9a, 9b are positioned in parallel with clamping dies 5a, 5b in the starting position, the clamping dies 9a, 9b will be turned by an amount corresponding to the original angle β, δ and α between the vertical axes, longitudinal axes and transverse axes, respectively, of the rails. Obviously, it is likewise possible to turn the rail 2 about its vertical axis $h_2$, its longitudinal axis $l_2$ as well as its transverse axis $t_2$ before the rail 2 is pressed against rail 1 in the longitudinal direction of the upsetting cylinders in order to perform the welding operation proper, should the original external configuration of the rail 2 be of such a nature that an angular adjustment is required in more than one direction in order to obtain a straight running surface. Preferably, the angles α, β and δ are in the range from −5° to +5°, particularly from −2° to +2°.

Since the piston rods of the upsetting cylinders may move also at different mutual speeds during the very pressing operation, it becomes possible to adjust the orientation of the rails with respect to one another also during this operation. As a result, the continuous rail formed in the welding-together operation will exhibit an even running surface on which the railroad car wheels travel. Should the running surface of the finished rail, notwithstanding the angular adjustments mentioned above made prior to and/or during the very pressing operation, not be completely straight after the welding operation a final adjustment of the rail 2 may be made with the aid of the actuating and upsetting cylinders before the formed welding joint has hardened completely.

FIG. 4 illustrates a mobile welding device for welding together two rails, only one of which, designated 40, is illustrated in this drawing figure. This device is intended to be used when it is desired to weld together rails in situ on the railroad track. In order to avoid that the device becomes too heavy to be moved, its dimensions have been halved, compared to those of the previously described, stationary variety of the device. With the exception of the elimination in this variety of a stationary frame, it is designed on the same principles as the stationary variety.

This device is provided with two pairs of clamping dies 41 and 42 which are used to clamp one rail each. Each clamping die pair consists of two clamping dies 41a, 41b and 42a, 42b, respectively, which dies are clamped about its associated rail by means of cylinders 43 and 44, respectively. The electrodes, not shown, are mounted on the clamping dies in this case. Also in accordance with this embodiment the clamping die pairs 41 and 42 correspond to the frame 3 and the carriage 4, respectively, according to the stationary variety with the exception that both clamping die pairs are displacable in the lengthwise direction of the rails by means of three pressure cylinders 45, 46, and 47. These cylinders correspond to cylinders 13, 14, and 15, respectively, of the stationary device. In this embodiment all upsetting cylinders are, however, positioned above the longitudinal axis $l_{40}$ of the rail 40. This arrangement does not however, give rise to any problems, although the longitudinal axes $l_{45}$, $l_{46}$ and $l_{47}$ in this case do not coincide with the longitudinal axis of the rail, since the moment of force of the cylinders 46, 47 is absorbed during the upsetting operation by the cylinder 45, the piston rod of which operates in the opposite direction to that of the piston rods of cylinders 46 and 47.

By the expression individually controllable upsetting or actuating cylinders should be understood that each cylinder is controlled with respect to the position of the outer end of its associated piston rod, the outer ends of the piston rods assuming their extreme outer positions in the starting position. During the angular adjustment and the very pressing-together operation the cylinder piston rods are then caused to move in a direction towards their innermost positions. Because all cylinders are controlled with respect to their individual positions it is ensured that the cylinder piston rods do not travel neither ahead of nor lag behind one another. In other words, the frame and the carriage always assume the same mutual relationship as regards parallelism during the entire pressing-together operation, irrespective of where the resistance, i.e. the centre of force of the current work piece, is found.

In prior-art welding devices the problem has been solved with the aid of a linearly mounted carriage, or with the aid of levers, or by relinquishing the requirement of alignment during the pressing-together operation, but a common feature still is that a moment of force must be absorbed by the frame while the work pieces are being pressed together. As appears from the above description of the welding device in accordance with the present invention only the forces that will displace the work pieces laterally and vertically need to be absorbed by the frame in the case of the subject welding device, since the moment of force generated by the pressing forces essentially has been eliminated.

Obviously, the invention is not limited to the embodiment described above but may be modified in a variety of different ways within the scope of the dependent claims. For instance, the upsetting cylinders 13, 14, and 15 may be positioned in a Y-shaped configuration instead of the configuration referred to above.

Instead of using actuating cylinders 29 and 30 to bring about the lateral and vertical displacement, other positioning means, such as an electric motor or a set screw may be used. Instead of positioning two shafts 21, 22 in the bore 20 one shaft may be eccentrically mounted inside the bore 20 and in this case-the vertical adjustment is achieved by turning the shaft, and in order to turn the rail 2 about its longitudinal axis $l_2$ eccenter or other resetting means may be provided at the slide blocks 31 and 32.

The work pieces need not consist of two rails 1 and 2 but could consist of two square rods to be welded together by so called upsetting. In this case it may be difficult to initiate the very welding process, owing to the considerable short-circuiting risks with consequential surge, due to the considerable surface of contact between the rods because their end faces and consequently their transverse, vertical, and longitudinal axes are parallel in the starting position. For this reason, one work piece is turned relatively to the other work piece prior to the very welding-together operation, with the aid of two individually controllable actuators in the form of e.g. two upsetting cylinders or two actuating cylinders, the latter cylinder, like in the previous case being arranged to turn one work piece about the longitudinal axis thereof. For instance, one work piece is turned in such a manner relative to the other work piece that the vertical axes of the work pieces form an angle β between one another. Once the very welding operation has started, said work piece is turned backwards over angle β in order to give a straight welding joint.

I claim:

1. A device for welding together a first longitudinally elongated work piece with a second longitudinally elongated work piece in an end face-to-end face fashion by means of butt-weld resistance welding, each of said work pieces having a respective and corresponding longitudinal, vertical and transverse axis which form respective and pre-existing α, β, and δ angles between the work pieces prior to welding, comprising:

a frame structure;

a carriage connected to said frame structure and slidable in the longitudinal direction of the work pieces;

a first clamping device mounted on said frame structure to fixedly clamp the first work piece;

a second clamping device mounted on said carriage to fixedly clamp said second work piece;

electrodes mounted on one of the frame structure, carriage, and clamping devices to heat the work pieces to a desired welding temperature;

a press element to force the facing ends of the heated work pieces against one another in the longitudinal direction to form a bonding welding joint, wherein said press element comprises at least two sets of actuators, each of which are individually controllable relative to one another for turning the respective facing ends of each of the work pieces in a manner such that the pre-existing angles of the transverse, vertical, and longitudinal axes of the work pieces are eliminated at at least one of prior to, during, and after a welding operation.

2. The device as claimed in claim 1, wherein at least one of the actuators simultaneously serves as a press element.

3. The device as claimed in claim 2, wherein the predetermined angle with respect to the transverse axis is in the range from −5° to +5°.

4. The device as claimed in claim 3 wherein the range is between −2° to 2°.

5. The device as claimed in claim 2, wherein the predetermined angle with respect to the vertical axis is in the range from −5° to +5°.

6. The device as claimed in claim 5 wherein the range is between −2° to 2°.

7. The device as claimed in claim 2, wherein the predetermined angle with respect to the longitudinal axis is in the range from −5° to +5°.

8. The device as claimed in claim 7 wherein the range is between −2° to 2°.

9. The device as claimed in claim 2, wherein the actuators consist of a first and a second actuating cylinder and associated piston rods, one end of each actuating cylinder being pivotally connected to the carriage and wherein said carriage includes at least one shaft extending in an interior of the carriage, said at least one shaft rotatably connected at one end thereof to an opposite end of each actuating cylinder, and the other end of said shaft eccentrically mounted in a first aperture formed in the frame, the piston rods of said actuating cylinders arranged to move at mutually different speeds, whereby the carriage and the second work piece clamped to the carriage are adapted to turn about the longitudinal axis of said second work piece such that the end face of the second work piece assumes a position relative to an end face of the first work piece wherein the angle formed between the transverse axes of said work pieces is one of a predetermined value and zero.

10. The device as claimed in claim 2, wherein each of the actuators are respectively formed by an upsetting cylinder having a body and an associated piston rod, each of the cylinder bodies of the upsetting cylinders being pivotally connected to one of the frame structure and the carriage, each of the piston rods being pivotally connected to the other of said carriage and frame structure, the piston rods of said upsetting cylinders arranged to move at mutual different speeds, whereby the carriage and the second work piece clamped to the carriage are adapted to turn about the transverse axis of the second work piece such that an end face of said second work piece assumes a position relative to an end face of the first work piece wherein an angle formed between the vertical axes of each of said work pieces is zero.

11. The device as claimed in claim 2, wherein the upsetting cylinders are pivotally connected at their ends to the frame structure and to the carriage at separate attachment points, said points positioned relative to one another such that a total moment of force exerted on the frame structure during the pressing operation is zero.

12. The device as claimed in claim 1, wherein the actuators consist of a first and a second actuating cylinder and associated piston rods, one end of each actuating cylinder being pivotally connected to the carriage and wherein said carriage includes at least one shaft extending in an interior of the carriage, said at least one shaft rotatably connected at one end thereof to an opposite end of each actuating cylinder, and the other end of said shaft eccentrically mounted in a first aperture formed in the frame, the piston rods of said actuating cylinders arranged to move at mutually different speeds, whereby the carriage and the second work piece clamped to the carriage are adapted to turn about the longitudinal axis of said second work piece such that the end face of the second work piece assumes a position relative to an end face of the first work piece wherein the angle formed between the transverse axes of said work pieces is one of a predetermined value and zero.

13. The device as claimed in claim 12, wherein the upsetting cylinders are pivotally connected at their ends to the frame structure and to the carriage at separate attachment points, said points positioned relative to one another such that a total moment of force exerted on the frame structure during the pressing operation is zero.

14. The device as claimed in claim 1, wherein each of the actuators are respectively formed by an upsetting cylinder having a body and an associated piston rod, each of the cylinder bodies of the upsetting cylinders being pivotally connected to one of the frame structure and the carriage, each of the piston rods being pivotally connected to the other of said carriage and frame structure, the piston rods of said upsetting cylinders arranged to move at mutual different speeds, whereby the carriage and the second work piece clamped to the carriage are adapted to turn about the transverse axis of the second work piece such that an end face of said second work piece assumes a position relative to an end face of the first work piece wherein an angle formed between the vertical axes of each of said work pieces is zero.

15. The device as claimed in claim 14, wherein the press element includes a third actuator formed by a third upsetting cylinder having a body and associated piston rod, said third cylinder body and piston rod respectively connected to the frame structure and carriage the same as said first and second cylinder bodies and rods, the second and the third upsetting cylinders arranged such that at least one of the piston rods is movable at a different speed from that of the other two piston rods, whereby the carriage and the second work piece clamped to the carriage are adapted to turn about the transverse axis of the second work piece such that the end face of the second work piece assumes a position relative to an end face of the first work piece wherein the angle formed between the vertical axes of each of said work pieces is one of a predetermined value and zero.

16. The device as claimed in claim 5, wherein the carriage and the second work piece clamped to said carriage are adapted to turn about the longitudinal axis of the second work piece such that the end face thereof assumes a position relative to the end face of the first work piece such that the angle formed between the transverse axes of each of said work pieces is one of a predetermined value and zero wherein the piston rods of the upsetting cylinder units are arranged to move such that at least one of the piston rods is moved at a different speed from that of the other piston rods, whereby the carriage and the second work piece clamped to said carriage are adapted to turn about the transverse axis of the second work piece such that an end face of said second work piece assumes a position relative to an end face of the first work piece such that the angle formed between the vertical axes of each of said work pieces is one of a predetermined value and zero and to turn about the vertical axis of the second work piece such that said second work piece assumes a position relative to the first work piece such that the angle formed between the longitudinal axes of each of said work pieces assumes one of a predetermined value and zero.

17. The device as claimed in claim 16, wherein the upsetting cylinders are pivotally connected at their ends to the frame structure and to the carriage at separate attachment points, said points positioned relative to one another such that a total moment of force exerted on the frame structure during the pressing operation is zero.

18. The device as claimed in claim 15, wherein the carriage and the second work piece clamped to said carriage are adapted to turn about the longitudinal axis of the second work piece such that the end face thereof assumes a position relative to the end face of the first work piece such that the angle formed between the transverse axes of each of said work pieces is one of a predetermined value and zero wherein the piston rods of the upsetting cylinder units are arranged to move such that at least one of the piston rods is moved at a different speed from that of the other piston rods, whereby the carriage and the second work piece clamped to said carriage are adapted to turn about the transverse axis of the second work piece such that an end face of said second work piece assumes a position relative to an end face of the first work piece such that the angle formed between the vertical axes of each of said work pieces is one of a predetermined value and zero and to turn about the vertical axis of the second work piece such that said second work piece assumes a position relative to the first work piece such that the angle formed between the longitudinal axes of each of said work pieces assumes one of a predetermined value and zero.

19. The device as claimed in claim 15, wherein the upsetting cylinders are pivotally connected at their ends to the frame structure and to the carriage at separate attachment points, said points positioned relative to one another such that a total moment of force exerted on the frame structure during the pressing operation is zero.

20. The device as claimed in claim 15, whereby the carriage and the second work piece clamped to the carriage are adapted to turn about the vertical axis of the second work piece such that the second work piece assumes a position relative to the first work piece, wherein the angle formed between the vertical axis of said work piece is one of a predetermined value and zero.

21. The device as claimed in claim 14, wherein the carriage and the second work piece clamped to said carriage are adapted to turn about the longitudinal axis of the second work piece such that the end face thereof assumes a position relative to the end face of the first work piece such that the angle formed between the transverse axes of each of said work pieces is one of a predetermined value and zero wherein the piston rods of the upsetting cylinder units are arranged to move such that at least one of the piston rods is moved at a different speed from that of the other piston rods, whereby the carriage and the second work piece clamped to said carriage are adapted to turn about the transverse axis of the second work piece such that an end face of said second work piece assumes a position relative to an end face of the first work piece such that the angle formed between the vertical axes of each of said work pieces is one of a predetermined value and zero and to turn about the vertical axis of the second work piece such that said second work piece assumes a position relative to the first work piece such that the angle formed between the longitudinal axes of each of said work pieces assumes one of a predetermined value and zero.

22. The device as claimed in claim 14, wherein the upsetting cylinders are pivotally connected at their ends to the frame structure and to the carriage at separate attachment points, said points positioned relative to one another such that a total moment of force exerted on the frame structure during the pressing operation is zero.

23. The device as claimed in claim 14, whereby the carriage and the second work piece clamped to the carriage are adapted to turn about a vertical axis of the second work piece such that an end face thereof assumes a position relative to an end face of the first work piece, wherein an angle formed between the longitudinal axes of each respective work piece is zero.

24. The device as claimed in claim 1, wherein the upsetting cylinders are pivotally connected at their ends to the frame structure and to the carriage at separate attachment points, said points positioned relative to one another such that a total moment of force exerted on the frame structure during a pressing operation is zero.

* * * * *